United States Patent
Biss et al.

(10) Patent No.: US 10,652,859 B2
(45) Date of Patent: May 12, 2020

(54) COMMUNICATION DEVICE AND A METHOD FOR OPERATING A COMMUNICATION DEVICE

(71) Applicant: Intel IP Corporation, Santa Clara, CA (US)

(72) Inventors: Kristian Biss, Schnaittach (DE); Roland Gruber, Sauerlach (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/305,067

(22) PCT Filed: May 29, 2017

(86) PCT No.: PCT/US2017/034906
§ 371 (c)(1),
(2) Date: Nov. 28, 2018

(87) PCT Pub. No.: WO2018/004912
PCT Pub. Date: Jan. 4, 2018

(65) Prior Publication Data
US 2019/0357176 A1    Nov. 21, 2019

(30) Foreign Application Priority Data
Jun. 29, 2016   (EP) .................................... 16176835

(51) Int. Cl.
*H04W 4/00*      (2018.01)
*H04W 72/02*     (2009.01)
(Continued)

(52) U.S. Cl.
CPC ........... *H04W 72/02* (2013.01); *H04W 24/10* (2013.01); *H04W 72/0453* (2013.01);
(Continued)

(58) Field of Classification Search
CPC ..... H04W 24/10; H04W 48/12; H04W 48/18; H04W 48/20; H04W 72/02;
(Continued)

(56) References Cited

U.S. PATENT DOCUMENTS 9,332,470 B2    5/2016   Won et al.
2013/0142104 A1  6/2013   Lee et al.
(Continued)

FOREIGN PATENT DOCUMENTS

KR      1020130053378 A      5/2013

OTHER PUBLICATIONS

3GPP, Tecnhical Specification Group Radio Access Network; Evolved Universal Terrestrial Radio Access (E-UTRA); User Equipment (UE) procedures in idle mode, 3rd Generation Partnership Project, TS36.304, Jun. 2016, 46 pages, V13.2.0.
(Continued)

*Primary Examiner* — Minh Trang T Nguyen (57) ABSTRACT

A method and a mobile device configured, when in idle mode, to select a target frequency from a network in response to a redistribution information from the network, including starting an evaluation timer; performing measurements on a first set of frequencies throughout a duration of the evaluation timer; selecting the target frequency based on the measurements of the first set of frequencies; and starting a second timer, which is distinct from the evaluation timer, during which time the device performs measurements on a second set of frequencies comprising the target frequency.

25 Claims, 6 Drawing Sheets

(51) Int. Cl.
  *H04W 76/28*   (2018.01)
  *H04W 76/27*   (2018.01)
  *H04W 24/10*   (2009.01)
  *H04W 72/04*   (2009.01)
  *H04W 72/10*   (2009.01)

(52) U.S. Cl.
  CPC ........... *H04W 72/10* (2013.01); *H04W 76/27* (2018.02); *H04W 76/28* (2018.02)

(58) Field of Classification Search
  CPC . H04W 72/0453; H04W 72/10; H04W 76/27; H04W 76/28; Y02D 70/1242; Y02D 70/1262; Y02D 70/1264; Y02D 70/142; Y02D 70/144; Y02D 70/20; Y02D 70/24
  See application file for complete search history.

(56) References Cited

U.S. PATENT DOCUMENTS

2015/0017987 A1  1/2015  Won et al.
2015/0230141 A1  8/2015  Zou et al.
2017/0026861 A1*  1/2017  Tseng .................... H04B 17/318
2019/0021009 A1*  1/2019  Ku ......................... H04W 16/04

OTHER PUBLICATIONS

3GPP, Tecnhical Specification Group Radio Access Network; Evolved Universal Terrestrial Radio Access (E-UTRA); Requirements for support of radio resource management, 3rd Generation Partnership Project, TS36.133, Mar. 2016, 363 pages, V13.3.0.

3GPP, Tecnhical Specification Group Radio Access Network; Evolved Universal Terrestrial Radio Access (E-UTRA); Radio Resource Control (RRC); Protocol specification, 3rd Generation Partnership Project, TS36.331, Jun. 2016, 624 pages, V13.2.0.

3GPP, Tecnhical Specification Group Radio Access Network; Evolved Universal Terrestrial Radio Access (E-UTRA); User Equipment (UE) procedures in idle mode, 3rd Generation Partnership Project, TS36.304, Mar. 2016, 42 pages, V13.1.0.

European Search Report received for European patent Application No. 16176835.3 dated on Jan. 10, 2017, 12 pages.

ntemational Search Report received for PCT Application No. PCT/US2017/034906, dated Aug. 31, 2017, 5 pages.

\* cited by examiner

COMMUNICATION DEVICE AND A METHOD FOR OPERATING A COMMUNICATION DEVICE

CROSS-REFERENCE TO RELATED APPLICATIONS

This application is a national stage entry according to 35 U.S.C. § 371 of PCT Application No. PCT/US2017/034906 filed on May 29, 2017, which claims priority to European Patent Application Serial No. 16 176 835.3 filed on Jun. 29, 2016, both of which are incorporated herein by reference in their entirety.

TECHNICAL FIELD

Various aspects of this disclosure relate generally to a method and a device for mobile communications.

BACKGROUND

Release 13 of the Third Generation Partnership Project (3GPP) added a redistribution procedure for Long Term Evolution (LTE) Evolved Universal Terrestrial Radio Access (EUTRA) reselection in RRC IDLE. The measurement rules for lower priority inter-frequencies are implemented in a manner that in case the frequencies are configured with a redistribution factor broadcast by the network, the frequencies will always be measured. This will result in a high power consumption in the user equipment (UE).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the disclosure are described with reference to the following drawings, in which.

DESCRIPTION

The following detailed description refers to the accompanying drawings that show, by way of illustration, specific details and aspects of the disclosure which may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects.

The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry" or "processor") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel, e.g. frequency. There can be multiple cells on a single frequency. Each base station provides a cell with a specific ID, known as a cell ID. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is appreciated that the ensuing description may detail exemplary scenarios involving mobile terminal operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access). Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component)

As utilized herein, the term "idle mode" used in reference to a mobile terminal refers to a radio control state in which the mobile terminal is not allocated at least one dedicated communication channel of a mobile communication network. The term "connected mode" used in reference to a mobile terminal refers to a radio control state in which the mobile terminal is allocated at least one dedicated communication channel of a mobile communication network.

3GPP Release 13 added a redistribution procedure for LTE EUTRA reselection in RRC IDLE. In TS 36.304, Section 5.2.4.2, the measurement rules for lower priority inter-frequencies are set so that they are always measured if they are designated with the redistribution factor. Specifically, the change states that "if the serving cell fulfills Srxlev>SnonIntraSearchP and Squal>SnonIntraSearchQ, the UE may chose not to perform measurements of E-UTRAN inter-frequencies or inter-RAT frequency cells of equal or lower priority unless the UE is triggered to measure an E-UTRAN inter-frequency which is configured with redistributionInterFreqInfo," where the Srxlev is the cell selection reception level value, SnonIntraSearchP specifies the Srxlev threshold for E-UTRAN inter-frequency and inter-RAT measurements, Squal is the cell selection quality value, SnonIntraSearchQ specifies the Squal threshold for E-UTRAN inter-frequency and inter-RAT measurements. In other words, the 3GPP specifications state that if a UE receives a redistribution factor information from the network, the designated frequency(ies) will always be measured.

The redistributionInterFreqInfo is a redistribution information provided in System Information Block (SIB) 5 and triggers a E-UTRAN inter-frequency redistribution procedure. Similarly, the redistributionServingInfo is a redistribution information provided in SIB 3 and also triggers a E-UTRAN inter-frequency redistribution procedure.

The 3GPP guidelines do not provide any further guidance, e.g. if the frequencies with redistributionInterFreqInfo should be measured while the T360 timer is running. T360 is given in minutes, e.g. 4, 8, 16, or 32 minutes and keeps all inter-frequency measurements active. This increases run-time of the firmware (FW) even if the results are not needed for reselection, e.g. the results for low priority frequencies.

In sum, the current 3GPP guidelines start a redistribution procedure, perform the measurements (i.e. as instructed by the SIBs), perform a redistribution target selection, and start the T360 timer. As a result, the UE will select the frequency assigned by the network in the redistribution information, potentially resulting in overloading of the particular frequency.

The ensuing disclosure gives a random frequency, e.g. a target frequency specified for in the redistribution information broadcast by the network, a highest priority. In this manner, the chance that a particular frequency will be overloaded is reduced since UEs may be allocated on a wider spectrum of frequencies. Furthermore, because the UE will not measure lower priority frequencies in response to a low priority frequency being specified for in the redistribution information, power consumption will be less. In an aspect of this disclosure, once the target frequency is selected, there is no need to measure lower priority frequencies, even if they are included on the redistribution information.

With the idea of limiting the measurement evaluation to the Evolved Absolute Radio Frequency Channel Number (EARFCN) with a higher priority, i.e. the target frequency obtained from the redistribution algorithm, and not including all inter-frequencies with lower priority (including those from the redistribution information), the power consumption will be reduced.

In general, what is disclosed herein is a device which, in response to a redistribution procedure being triggered (e.g. a redistributionInterFreqInfo is given), is configured to start an evaluation timer, activate a measurement of a plurality of frequencies (e.g. frequencies provided to the device from the network), select one of the frequencies measured as a target frequency (e.g. by performing a redistribution algorithm), and then start a T360 timer, during which time the target frequency is of a higher priority, regardless of the information broadcast by the network. The device is configured to implement the evaluation timer in order to detect all possible target cells, i.e. the evaluation timer is configured so that it is long enough in duration to detect all cells to perform the target selection. The evaluation timer and the selection of the target frequency is controlled by Radio Resource Control (RRC).

Figure 1:
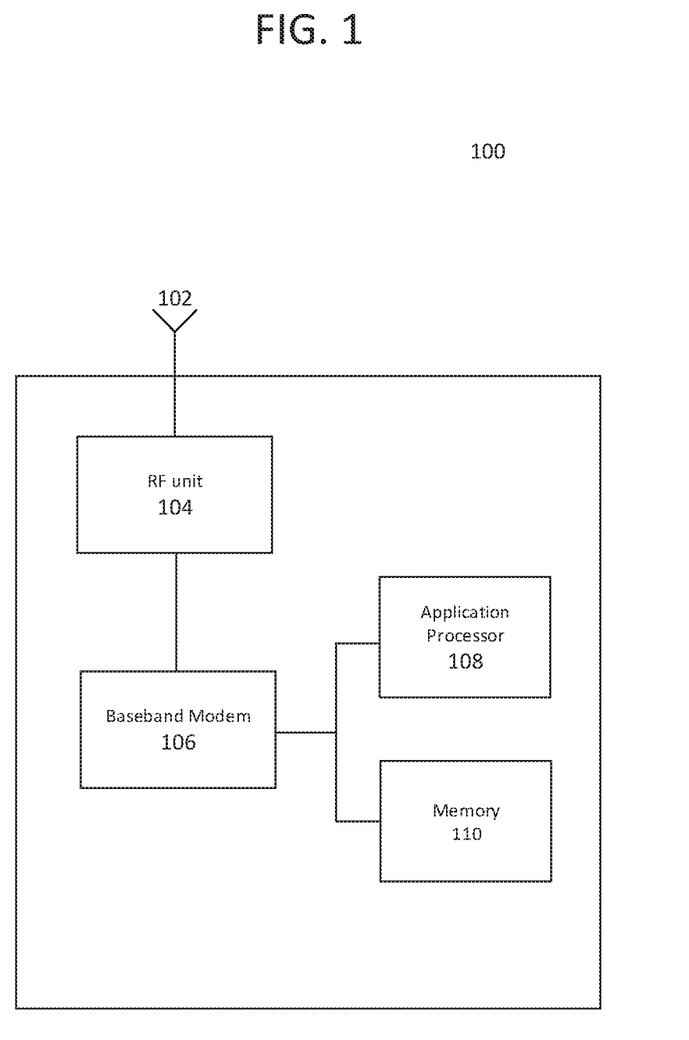
FIG. 1 shows a communication device in an aspect of this disclosure.

FIG. 1 shows a UE 100 in an exemplary aspect of this disclosure. UE 100 is configured to grant access to its radio frequency (RF) unit 104 from a plurality of signals based on performance considerations and/or signal status. It is appreciated that UE 100 is exemplary in nature and may thus be simplified for purposes of this explanation.

As shown in FIG. 1, UE 100 may include an antenna 102, a radio frequency (RF) unit 104, baseband modem 106, application processor 108, a memory component 110, and two SIMs 120, 122

These components may be implemented separately; however, it is appreciated that the configuration of UE 100 is for purposes of explanation, and accordingly, one or more of the aforementioned components of UE 100 may be integrated into a single equivalent component or divided into multiple components with collective equivalence. It is also appreciated that UE 100 may have one or more additional components, such as hardware, software, or firmware elements. For example, UE 100 may also include various additional components including processors, microprocessors, at least one power supply, peripheral device(s) and other specialty or generic hardware, processors, or circuits, etc., in order to support a variety of additional operations. For example, UE 100 may also include a variety of user input/output devices, such as display(s), keypad(s), touchscreen(s), speaker(s), microphone(s), button(s), camera(s), etc. Furthermore, it is appreciated that the connections between components in UE 100 may be modified, e.g. SIM1 120 and/or SIM2 122 may be directly coupled to baseband modem 106.

In an overview, UE 100 may be configured to receive and/or transmit wireless signals according to multiple different wireless access protocols or radio access technologies (RATs), for example, any one or combination of: Long-Term Evolution (LTE), Global System for Mobile Communications (GSM), Universal Mobile Telecommunications System (UMTS), Code Division Multiple Access (CDMA), Wideband CDMA (W-CDMA), Wi-Fi, Wireless Local Area Network (WLAN), Bluetooth, etc. It is appreciated that separate components may be provided for each distinct type of compatible wireless signal, such as a dedicated LTE antenna, RF transceiver, and baseband modem for LTE reception and transmission and a dedicated Wi-Fi antenna, RF transceiver, and a baseband modem for Wi-Fi reception and transmission. Alternatively, one or more components of UE 100 may be shared between different wireless access protocols, such as, for example, by sharing an antenna 102 between multiple different wireless access protocols or RATs. In an exemplary aspect of this disclosure, RF unit 104 and/or baseband modem 106 may operate according to multiple communication access protocols (i.e. "multimode"), and thus may be configured to support one or more of LTE, GSM, and/or UMTS access protocols.

Furthermore, RF unit 104 may receive frequency wireless signals via antenna 102, which may be implemented, for example, as a single antenna or an antenna array composed of multiple antennas. Antenna 102 may be an external antenna or an internal antenna. RF unit 104 may include various reception circuitry elements, for example, analog circuitry configured to process externally received signals, such as circuitry to convert externally received RF signals to baseband and/or intermediate frequencies. RF unit 104 may also include amplification circuitry to amplify externally received signals, such power amplifiers and/or Low Noise Amplifies, although it is appreciated that such components may also implemented separately. RF unit 104 may additionally include various transmission circuit elements configured to transmit signals, such as, for example, baseband and/or intermediate frequency signals provided by the baseband modem 106, which may include mixing circuitry to modulate signals onto one or more radio frequency carrier waves and/or amplification circuitry to amplify internal signals before transmission. The RF unit 104 may provide such signals to antenna 102 for wireless transmission. Although not explicitly depicted in FIG. 1, RF unit 104 may be additionally connected to other components of the UE 100.

Baseband modem 106 may include one or more digital processing circuits and a baseband memory. Baseband modem 106 may further include one or more additional components, including one or more analog circuits.

The digital processing circuits may be composed of various processing circuitry configured to perform baseband (also including "intermediate") frequency processing, such as Analog to Digital Converters and/or Digital to Analog Converters, modulation/demodulation circuitry, encoding/decoding circuitry, audio codec circuitry, digital signal processing circuitry, etc. The digital processing circuit(s) may include hardware, software, or a combination of hardware and software. Specifically, digital processing circuit(s) of baseband modem 106 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof.

The baseband memory may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. The baseband memory may be configured to store software elements, which may be retrieved and executed using a processor component of digital processing circuitry. The baseband memory may be implemented as one or more separate components in the baseband modem 106 and may also be partially or fully integrated with the digital processing circuitry.

The baseband modem 106 may be configured to operate one or more protocol stacks, such as a GSM protocol stack, an LTE protocol stack, a UMTS protocol stack, a CDMA protocol stack, etc. or any combination thereof. Baseband modem 106 may be multimode and may thus be configured to operate in accordance with multiple RATs by executing multiple protocol stacks simultaneously. The digital processing circuit(s) in the baseband modem may therefore include a processor configured to execute program code in accordance with the protocol stacks of each associated RAT. The baseband memory may be store the aforementioned program code. The baseband modem 106 may be configured to control one or more further components of mobile terminal 100. The protocol stack(s) of baseband modem 106 may be configured to control operation of the baseband modem 106, such as in order to transmit and receive mobile communication in accordance with the corresponding RAT(s).

It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 106 may be detailed herein substantially in terms of functional operation in recognition that a person of skill in the art may readily appreciate the various possible structural realizations of baseband modem 106 using digital processing circuitry that will provide the desired functionality.

In an exemplary aspect of the disclosure, when a redistribution procedure is triggered, the baseband modem is configured to start an evaluation timer and activate measurements of a set of frequencies to gather information during the duration of the evaluation timer; perform a redistribution algorithm in order to select a target frequency; and trigger a T360 timer, during which additional measurements of the frequencies are performed. After the T360 expires, the baseband modem is configured to commence a new redistribution evaluation.

The redistribution procedure may be triggered when the UE receives the required system information blocks (SIBs) from the network, i.e. SIB 3 with the redistributionServingInfo and/or SIB 5 with the redistributionInterFreqInfo. The baseband modem is further configured to implement the redistribution algorithm to use all the measured frequencies in the evaluation in order to select a target frequency.

After selecting the target frequency, the baseband modem is further configured to assign the target frequency the highest priority, regardless of the reselection priorities received in the SIBs.

The baseband modem may be further configured to determine the duration of the evaluation timer based on at least one of the following criteria: the number of inter frequencies; the time needed for detection of new cells; or the discontinuous reception (DRX) cycle length. For example, the baseband modem may determine the duration of the evaluation timer in order to measure each of the frequencies at least two times, i.e. two DRX cycle measurements. In this way, an average of the measurements can be used in order to ensure more accurate results.

In a further aspect of this disclosure, the baseband modem may be configured to define the length of the evaluation timer by any of the following. The baseband modem may be configured to wait N*DRX cycles to receive the inter-frequency measurements, where N is a number greater than or equal to 2. The baseband modem may be configured to wait for a determined measurement indication time, M, for each measured inter-frequency.

The baseband modem may be further configured to define the evaluation time according to TS 36.133 Section 4.2.2.4, wherein the UE shall be able to evaluate whether a newly detectable inter-frequency cell in normal performance group meets the reselection criteria defined in TS 36.304 within $K_{carrier,normal}*T_{detect,EUTRAN\_Inter}$, and able to evaluate whether a newly detectable inter-frequency cell in a reduced performance group meets the resection criteria defined in TS 36.304 within $6*K_{carrier,reduced}*T_{detect,EUTRANInter}$. Values from Table 4.2.2.4-1 in TS 36.133 may be used in these calculations. The baseband modem may be configured to reduce the calculated time by a factor of at least two.

In another embodiment, the baseband modem may be configured to define the evaluation time by waiting for the layer 1 (L1) filtered results for all the detected cells, wherein each frequency should be reported at least two times.

The application processor 108 may be implemented as a Central Processing Unit (CPU), and may function as a controller of mobile terminal 100. The application processor 108 may be configured to execute various applications and/or programs of mobile terminal 100, such as, for example, applications corresponding to program code stored in a memory component of mobile terminal 100 (not shown in FIG. 1). The application processor 108 may also be configured to control one or more further components of mobile terminal 100, such as, for example, input/output devices (e.g. display(s), keypad(s), touchscreen(s), speaker(s), microphone(s), button(s), etc.) peripheral devices, a memory, power supplies, external device interfaces, etc.

Although the baseband modem 106 and application processor 108 are depicted separately in FIG. 1, it is appreciated that the figure is not limiting in nature. It is understood that the baseband modem 106 and the application processor 108 may be implemented separately, implemented together (i.e. as an integrated unit), partially implemented together, etc.

Figure 2:
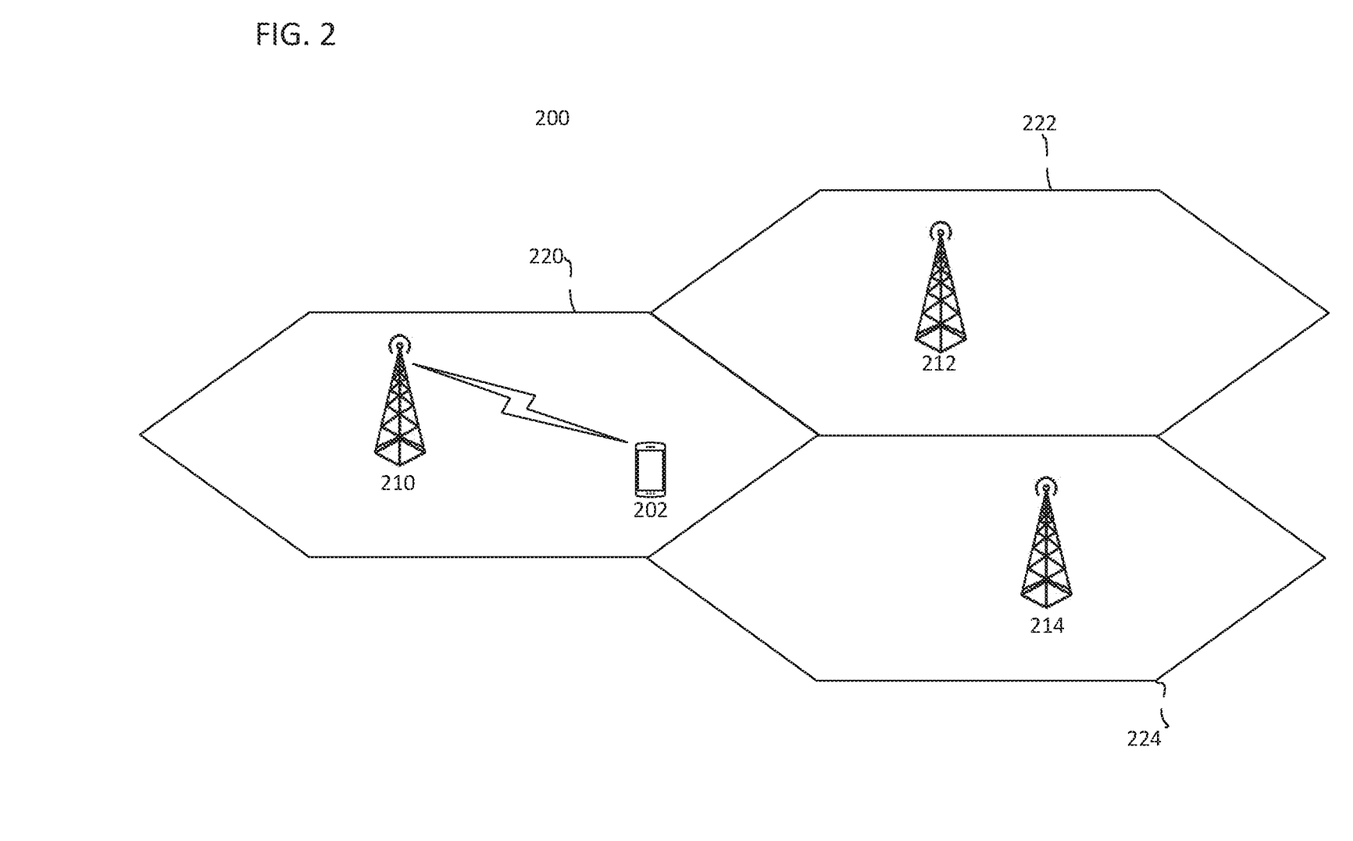
FIG. 2 shows a communication network in an aspect of this disclosure.

FIG. 2 shows a communication network 200 in an aspect of this disclosure. It is appreciated that network 200 is exemplary in nature and may thus be simplified for purposes of this explanation.

Communication network 200 consists of a series of cells, 220-224. Each cell may have at least one base station 210-214 (e.g. an eNB) serving the cell. Each base station 210-214 is associated with a radio access section of communication network 200, i.e. the Radio Access Network (RAN) of mobile communication network 200. The base stations may thus act as an interface between the RAN of mobile communication network 200 and an underlying core network of mobile communication network 200, and may allow any proximate UE, e.g. UE 202, to exchange data with the core network of mobile communication network 200 and any further networks connected thereto.

Each of base stations 210-214 may respectively provide mobile communication coverage to each its coverage regions, which may correspond to a single cell (i.e. sector) of a respective one of base stations or may be composed of multiple cells (i.e. sectors) of a respective one of base station. As shown in FIG. 2, for example, UE 202 may be physically located within cell 220 of base station 210. It is appreciated that although the coverage regions (i.e. the cells) are depicted as having distinct boundaries, it is understood that one or more of coverage regions may overlap, and accordingly there may exist geographical regions served by two or more of base stations 210-214.

Communication Network 200 may be configured in accordance with the network architecture of any one of, or any combination of, LTE (Long Term Evolution), WLAN (wireless local area network). WiFi, UMTS (Universal Mobile Telecommunications System), GSM (Global System for Mobile Communications), Bluetooth, CDMA (Code Division Multiple Access), Wideband CDMA (W-CDMA), etc. Accordingly, base stations 210-214 may be configured to provide an interface for communication devices, such as UE 202, to connect with any of the aforementioned network architectures.

UE 202 may be able to access communication network 200 through one or more of base stations 210-214 and/or through one or more RATs. Accordingly, UE 202 is configured as described herein in order to maximize performance.

UE 202 may have an internal configuration similar to that shown in FIG. 1. Furthermore, UE 202 may be configured to perform all the processes disclosed herein, e.g. triggering the methods disclosed herein upon receiving redistribution information (e.g. redistributionServingInfo and/or redistributionInterFreqInfo).

Figure 3:
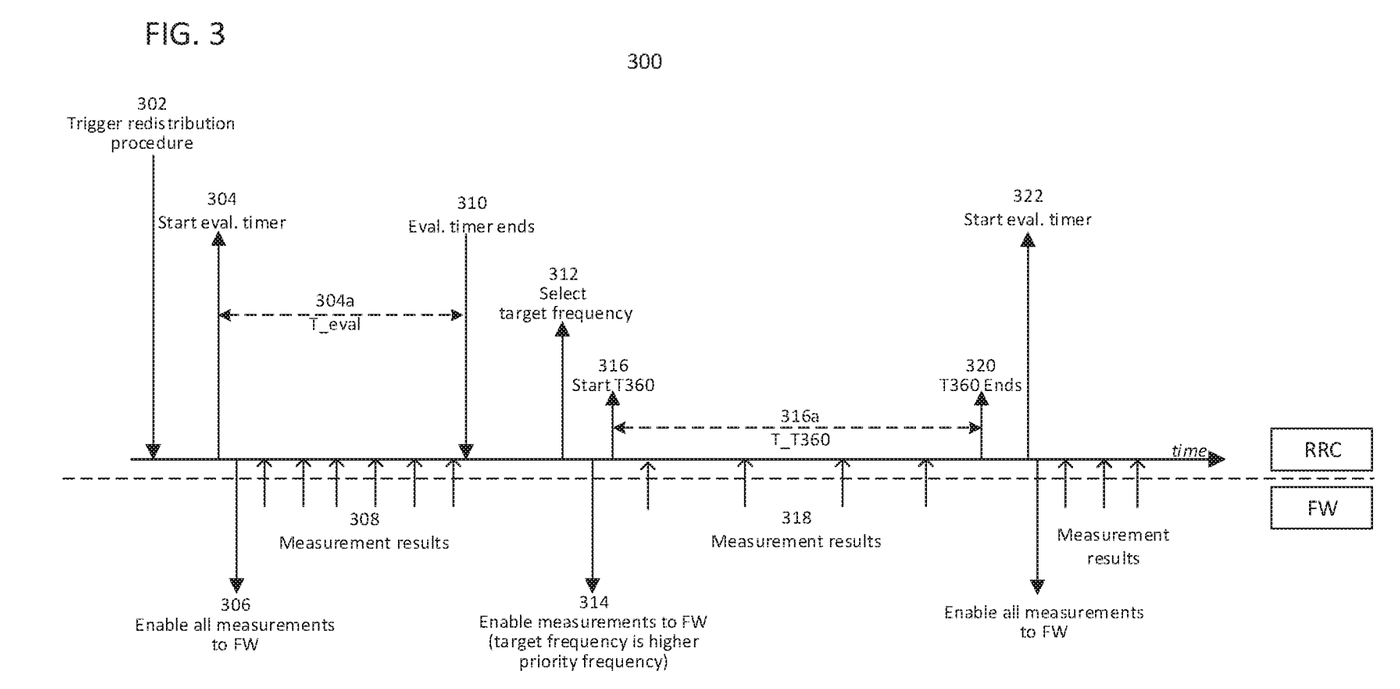
FIG. 3 shows a time diagram in an aspect of this disclosure.

FIG. 3 shows a timeline 300 of an aspect of this disclosure. It is appreciated that timeline 300 is exemplary in nature and may thus be simplified for purposes of this explanation.

In 302, the redistribution procedure is triggered. The redistribution process may be triggered when the device receives either a redistributionServingInfo and/or redistributionInterFreqInfo in SIBs from the network. Once the redistribution procedure is triggered, the UE will immediately start an evaluation timer 304, i.e. a new internal Radio Resource Control (RRC) timer. During the length of the evaluation timer, T_eval 304a, the baseband modem's firmware (FW) is configured to measure all configured inter-frequencies 306 and obtain the measurement results 308.

The duration of the evaluation timer, i.e. T_eval 304a, may depend on at least one of a number of factors. For example, T_eval 304a may depend on the number of inter-frequencies ($K_{carrier}$), the time needed for detection of new cells ($T_{detect,EUTRA\_Inter}$), and/or a discontinuous reception (DRX) cycle length. The DRX cycle length may be obtained, for example, from able 4.2.2.2-1 in TS 36.331 For example, T_eval 304a may be determined by multiplying the number of inter-frequencies ($K_{carrier}$) by the time needed for detection of new cells ($T_{detect,EUTRA\_Inter}$), i.e. T_eval=$K_{carrier}*T_{detect,EUTRA\_Inter}$. The baseband modem may be further configured to reduce the calculated time by a factor of at least two.

During T_eval 304a, the FW is configured to detect and report all cells/frequencies with a redistributionInterFreqInfo. The maximum time of T_eval 304a should be not be longer than approximately ½ the length of the T360 timer, T_T360 316a.

After the expiration of the evaluation timer 310, all measured cells/frequencies reported back from the measurement results in 308, are considered in the redistribution target evaluation, i.e. the selection of the target frequency from the redistribution algorithm. The redistribution algorithm may, for example, be the redistribution algorithm according to Section 5.2.4.10.1 in TS 36.304, reproduced below:

$$redistrRange[i] = \frac{redistrFactor[i]}{\sum_{j=0}^{j=(maxCandidates-1)} redistrFactor[j]} \quad (1)$$

The UE is configured to compile a sorted list of one or more candidate distribution targets, and for each candidate entry [j] a valid redistrFactor[j], in which entries are added in increasing index order with index 0 as outlined in Section 5.2.4.10.1.

After the UE selects the target frequency 312, it enables the measurements 314 as outlined in Section 5.2.4.2 in the 3GPP specifications with the exception that the E-UTRAN inter-frequency as configured in the redistributionInterFreqInfo is ignored, and instead, the target frequency selected in 312 is configured as a higher priority frequency. In other words, the redistribution target frequency will have the highest priority, regardless of the reselection priorities provided in the system information. High priority frequencies as specified in the SIBs are also scanned.

The UE then starts the T360 timer 316 which last for a duration of T_T360 316a until 320. During this time, the UE scans the high priority frequencies (including the target frequency) and obtains the measurement results 318. The frequencies scanned during the duration of the T360 timer are fewer in number than the frequencies scanned during the evaluation timer, resulting in a reduction in power consumption.

Upon expiration of the T360 timer 320, a new redistribution evaluation commences with the start of the evaluation timer 322.

Figure 4:
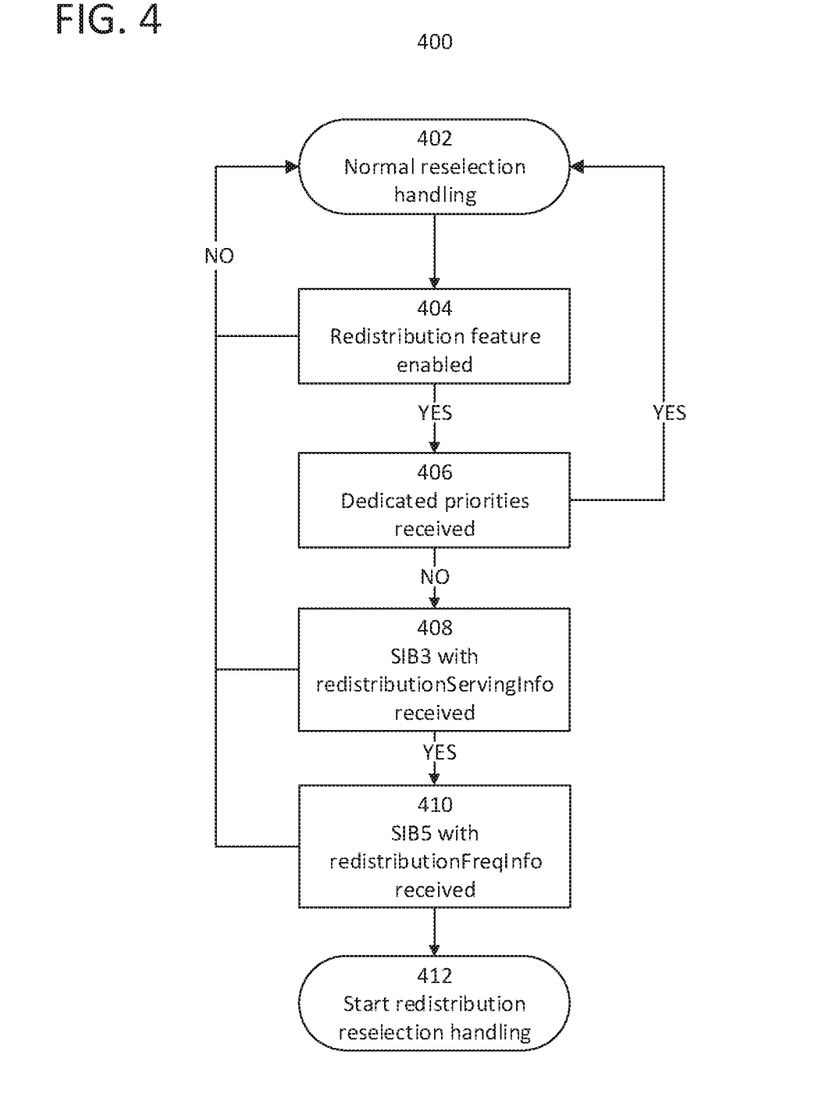
FIG. 4 shows a flowchart for determining when the disclosure herein is applicable.

FIG. 4 shows a flowchart 400 explaining when the reselection procedure as outlined in an aspect of this disclosure is applicable. It is appreciated that flowchart 400 is exemplary in nature and may thus be simplified for purposes of this explanation.

Once normal cell reselection handling is triggered 402, e.g. the UE detects another cell with better connection conditions, the next step is to determine whether the redistribution feature is enabled 404. If it is enabled, then the UE must determine whether the dedicated priorities have been received 406. If the dedicated priorities have not been received, then the determination must be made if the redistributionServingInfo in included in SIB3 408, and, if received, if the redistributionInterFreqInfo SIBS 410 was received. If both have been received by the UE, the UE may commence the redistribution reselection handling detailed herein.

Figure 5:
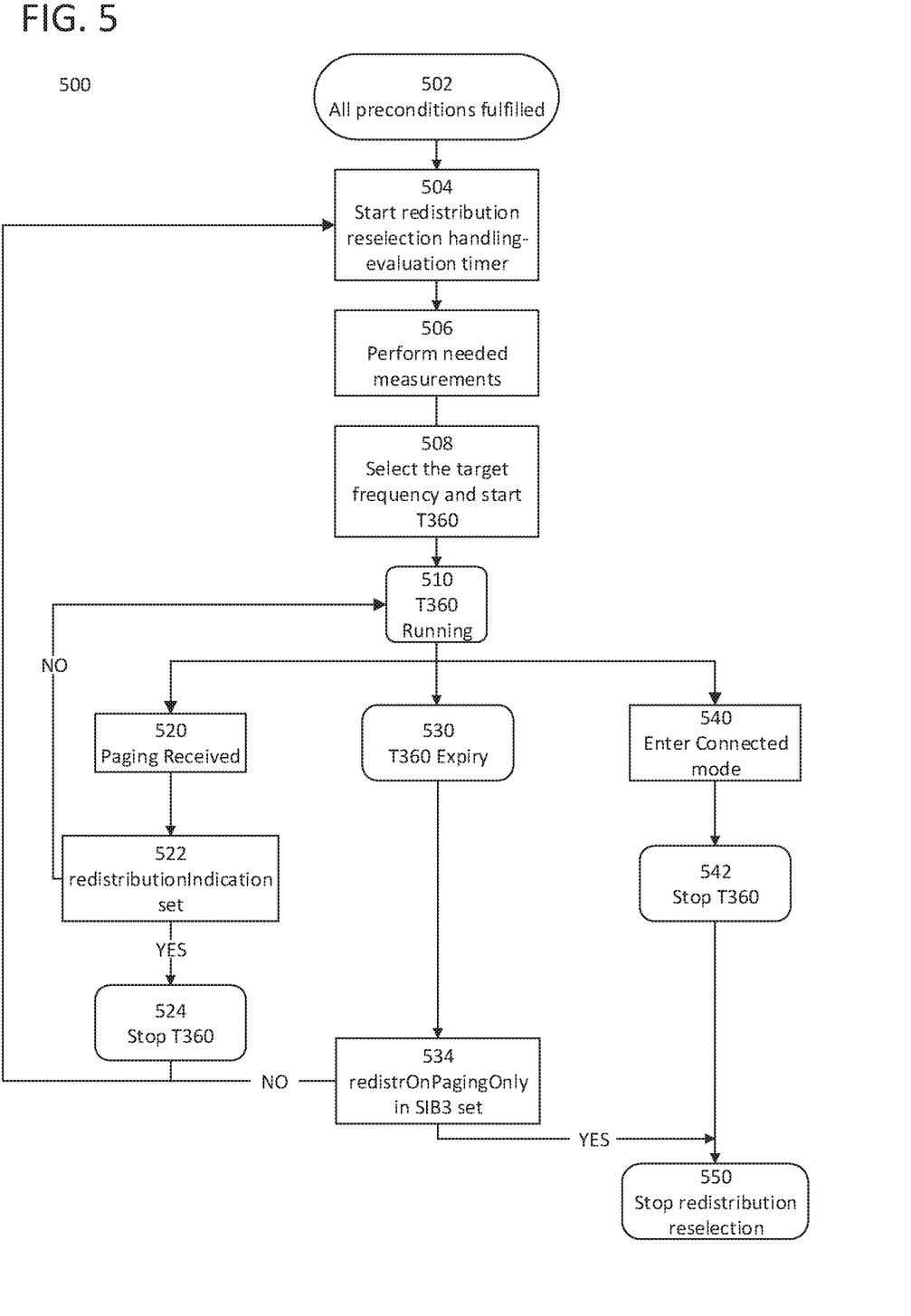
FIG. 5 shows a flowchart in an aspect of this disclosure.

FIG. 5 shows a flowchart 500 in an aspect of this disclosure. It is appreciated that flowchart 500 is exemplary in nature and may thus be simplified for purposes of this explanation.

Once all the preconditions as outlined in FIG. 4 are fulfilled 502, the UE starts the reselection handling 504 by starting the evaluation timer. At this point, the T360 timer is not running even though the paging with the redistribution indication has been received.

While the evaluation timer is running, the UE performs the needed measurements 506 in order to be able to select a target frequency. These measurements may include, for example, measuring all possible target cells/frequencies, and may further include, measuring all possible target cells/frequencies at least two times in order to be able to obtain an average value. After the measurements are performed, the target frequency is selected and the T360 timer is started 508. The UE may be configured to select the target frequency, for example, after applying a redistribution algorithm, such as the one recited in 3GPP TS 36.304, Section 5.2.4.10, to the frequency measurement results from 506. It is important to note that the redistribution algorithm in this disclosure is applied to the measurements results as obtained in 506, not just to the frequencies as indicated in the redistribution information as broadcast by the network.

Once the T360 is running 510, three scenarios are possible.

In a first scenario, if the UE enters connected mode 540, the T360 timer is stopped 360 and the redistribution reselection process is terminated 550.

In a second scenario, the T360 timer runs to completion and expires 530. At this point, the UE must determine if the redistrOnPagingOnly is present in SIB3 534. If it is, then the UE may proceed to terminate the redistribution reselection. If it is not, then the redistribution reselection process in this disclosure starts again 504 with the triggering if the evaluation timer.

In the third scenario, a paging is received 520. If there is a redistribution indication in the set 522, the T360 is stopped 524, and the redistribution reselection process in this disclosure starts again 504 with the triggering of the evaluation timer. If there is no redistribution indication in the set 522, the T360 continues running 510.

Figure 6:
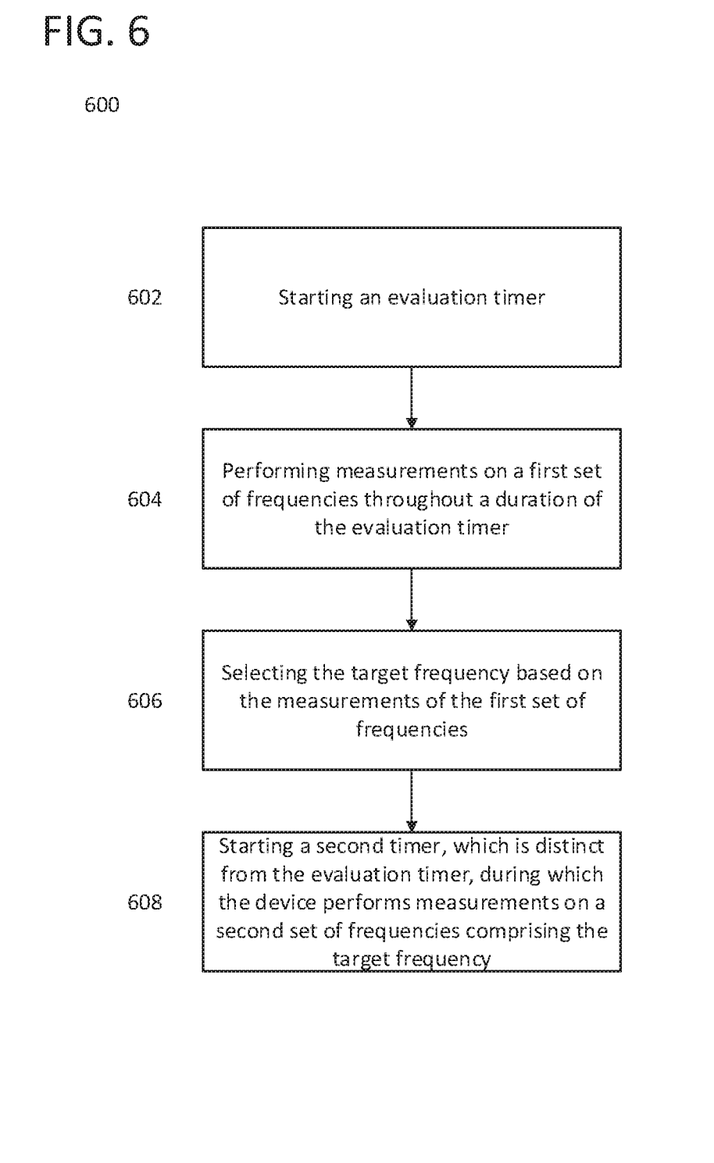
FIG. 6 shows a flowchart in an aspect of this disclosure.

FIG. 6 shows a flowchart 600 in an aspect of this disclosure. It is appreciated that flowchart 600 is exemplary in nature and may thus be simplified for purposes of this explanation.

In 602, an evaluation timer is started in response to a redistribution information from the network, e.g., in the case the redistributionInterFreqInfo includes a frequency of an equal or lower priority than the frequency on which the UE is currently camped on. In 604, the UE performs measurements on a first set of frequencies throughout a duration of the evaluation timer. For example, the first set of frequencies may include all inter-frequencies, regardless of priority (as broadcast in the SIBs). In 606, the target frequency is selected based on the measurements of the first set of frequencies. For example, the target frequency may be selected by using a redistribution algorithm. In 608, a second timer, which is distinct from the evaluation timer, is started, during which the device performs measurements on a second set of frequencies comprising the target frequency. The second timer may be, for example, a T360 timer. The second set of frequencies comprising the target frequency is smaller in number than the first set of frequencies.

In Example 1, a method for a mobile device in idle mode to select a target frequency from a network in response to a redistribution information, comprising: starting an evaluation timer; performing measurements on a first set of frequencies throughout a duration of the evaluation timer; selecting the target frequency based on the measurements of the first set of frequencies; and starting a second timer, which is distinct from the evaluation timer, during which time the device performs measurements on a second set of frequencies comprising the target frequency.

In Example 2, the subject matter of Example 1 may include the redistribution information comprising a redistributionInterFreqInfo.

In Example 3, the subject matter of Example 2 may include further comprising the device receiving the redistributionInterFreqInfo in a system information block (SIB) 5.

In Example 4, the subject matter of Examples 2-3 may include further comprising receiving a redistributionServingInfo from the network.

In Example 5, the subject matter of Example 4 may include further comprising receiving the redistributionServingInfo in a SIB 3.

In Example 6, the subject matter of Examples 1-5 may include wherein the first set of frequencies comprises inter-frequencies with the redistribution information provided to the device from the network.

In Example 7, the subject matter of Examples 1-6 may include wherein the evaluation timer is a Radio Resource Control (RRC) timer.

In Example 8, the subject matter of Examples 1-7 may include further comprising calculating the duration of the evaluation timer based on a number of inter-frequency carriers.

In Example 9, the subject matter of Example 8 may include further comprising calculating the duration of the evaluation timer based on a time needed to detect new cells.

In Example 10, the subject matter of Example 9 may include further comprising calculating the duration of the evaluation timer by multiplying the number of inter-frequency carriers by the time needed to detect new cells.

In Example 11, the subject matter of Example 10 may include further comprising reducing the calculated duration by a factor of at least 2.

In Example 12, the subject matter of Examples 1-11 may include further comprising calculating the duration of the evaluation timer based on a discontinuous reception (DRX) cycle length.

In Example 13, the subject matter of Example 12 may include wherein the duration of the evaluation timer is at least two times the DRX cycle length.

In Example 14, the subject matter of Examples 1-13 may include further comprising waiting for a measurement indication for each frequency.

In Example 15, the subject matter of Example 14 may include wherein the measurement indication for each frequency is an inter-frequency indication as determined by the device.

In Example 16, the subject matter of Examples 1-15 may include further comprising determining the duration of the evaluation timer by waiting for the results from a layer 1 component of the device for all cells detected during the frequency measurement while the evaluation timer is running.

In Example 17, the subject matter of Examples 1-16 may include further comprising measuring each frequency at least two times throughout the duration of the evaluation timer.

In Example 18, the subject matter of Examples 1-17 may include wherein the duration of the evaluation timer is at most one-half the length of the second timer.

In Example 19, the subject matter of Examples 1-18 may include further comprising performing a redistribution algorithm in order to select the target frequency.

In Example 20, the subject matter of Examples 1-19 may include wherein the second timer is a T360 timer.

In Example 21, the subject matter of Examples 1-20 may include wherein the first set of frequencies is indicated by information broadcast by the network.

In Example 22, the subject matter of Example 21 may include disregarding to measure one or more frequencies indicated in the redistribution information from the network during the second timer if the one or more frequencies are not high priority frequencies as indicated by the network.

In Example 23, the subject matter of Examples 1-22 may include wherein the second set of frequencies comprises fewer frequencies than the first set of frequencies.

In Example 24, a method for a mobile device in idle mode to select a target frequency from a network in response to a redistribution reselection including a redistributionInterFreqInfo of a frequency with a low priority, comprising: starting an evaluation timer; performing measurements on a first set of frequencies throughout a duration of the evaluation timer; selecting the target frequency based on the measurements of the first set of frequencies; and starting a second timer, which is distinct from the evaluation timer, during which time the device performs measurements on a second set of frequencies comprising the target frequency.

In Example 25, the subject matter of Example 24 may include

In Example 26, the subject matter of Examples 24-25 may include

In Example 27, the subject matter of Example 26 may include

In Example 28, the subject matter of Example 27 may include

In Example 29, the subject matter of Examples 24-28 may include

In Example 30, the subject matter of Example 29 may include

In Example 31, the subject matter of Examples 24-30 may include

In Example 32, the subject matter of Example 31 may include

In Example 33, the subject matter of Example 24 may include

In Example 34, the subject matter of Examples 24-33 may include

In Example 35, the subject matter of Examples 24-34 may include

In Example 36, the subject matter of Examples 24-35 may include

In Example 37, the subject matter of Examples 24-36 may include

In Example 38, the subject matter of Examples 24-37 may include

In Example 39, a communication device configured to select a target frequency from a network in response to a redistribution information, comprising: a radio frequency (RF) unit configured to receive a redistribution information from the network; a baseband modem configured to: trigger an evaluation timer; perform measurements on a first set of frequencies throughout a duration of the evaluation timer; select the target frequency based on the measurements of the first set of frequencies; and trigger a second timer, which is distinct from the evaluation timer, during which time the device performs measurements on a second set of frequencies comprising the target frequency.

In Example 40, the subject matter of Example 39 may include the redistribution information comprising a redistributionInterFreqInfo.

In Example 41, the subject matter of Example 40 may include the baseband modem further configured to receive the redistributionInterFreqInfo a system information block (SIB) 5 via the RF unit.

In Example 42, the subject matter of Examples 39-41 may include the redistribution information comprising a redistributionServingInfo.

In Example 43, the subject matter of Example 42 may include the baseband modem further configured to receive the redistributionServingInfo in a SIB 3 via the RF unit.

In Example 44, the subject matter of Examples 39-43 may include wherein the first set of frequencies comprises inter-frequencies with the redistribution information provided to the communication device from the network.

In Example 45, the subject matter of Examples 39-44 may include wherein the evaluation timer is a Radio Resource Control (RRC) timer.

In Example 46, the subject matter of Examples 39-45 may include the baseband modem further configured to calculate the duration of the evaluation timer based on a number of inter-frequency carriers.

In Example 47, the subject matter of Examples 39-46 may include the baseband modem further configured to calculate the duration of the evaluation timer based on a time needed to detect new cells.

In Example 48, the subject matter of Example 47 may include the baseband modem further configured to calculate the duration of the evaluation timer by multiplying the number of inter-frequency carriers by the time needed to detect new cells.

In Example 49, the subject matter of Example 48 may include the baseband modem further configured to reduce the calculated duration by a factor of at least 2.

In Example 50, the subject matter of Examples 39-45 may include the baseband modem further configured to calculate the duration of the evaluation timer based on a discontinuous reception (DRX) cycle length.

In Example 51, the subject matter of Example 50 may include wherein the duration of the evaluation timer is at least two times the DRX cycle length.

In Example 52, the subject matter of Examples 39-45 may include the baseband modem further configured to wait for a measurement indication for each frequency.

In Example 53, the subject matter of Example 52 may include wherein the measurement indication for each frequency is an inter-frequency indication as determined by the device.

In Example 54, the subject matter of Examples 39-45 may include the baseband modem further configured to determine the duration of the evaluation timer by waiting for the results from a layer 1 component of the device for all cells detected during the frequency measurement while the evaluation timer is running.

In Example 55, the subject matter of Examples 39-54 may include the baseband modem further configured to measure each frequency at least two times throughout the duration of the evaluation timer.

In Example 56, the subject matter of Examples 39-55 may include wherein the duration of the evaluation timer is at most one-half the length of the second timer.

In Example 57, the subject matter of Examples 39-56 may include the baseband modem further configured to perform a redistribution algorithm in order to select the target frequency In Example 58, the subject matter of Examples 39-57 may include wherein the second timer is a T360 timer.

In Example 59, the subject matter of Examples 39-58 may include wherein the second set of frequencies are high priority frequencies indicated by information broadcast by the network.

In Example 60, the subject matter of Examples 39-59 may include the baseband modem further configured to disregard measuring one or more frequencies indicated in a redistribution information from the network during the second timer if the one or more frequencies are not high priority frequencies.

In Example 61, the subject matter of Examples 39-60 may include wherein the second set of frequencies comprises fewer frequencies than the first set of frequencies.

In Example 62, a communication device configured to select a target frequency from a network in response to a redistribution reselection including a redistributionInterFreqInfo of a frequency with a low priority, comprising: a radio frequency (RF) unit configured to receive the a redistributionInterFreqInfo; a baseband modem configured to: start an evaluation timer; perform measurements on a first set of frequencies throughout a duration of the evaluation timer; select the target frequency based on the measurements of the first set of frequencies; and start a second timer, which is distinct from the evaluation timer, during which time the device performs measurements on a second set of frequencies comprising the target frequency.

In Example 63, the subject matter of Example 62 may include the baseband modem further configured to calculate the duration of the evaluation timer based on a number of inter-frequency carriers.

In Example 64, the subject matter of Examples 62-63 may include the baseband modem further configured to calculate the duration of the evaluation timer based on a time needed to detect new cells.

In Example 65, the subject matter of Example 64 may include the baseband modem further configured to calculate the duration of the evaluation timer by multiplying the number of inter-frequency carriers by the time needed to detect new cells.

In Example 66, the subject matter of Example 65 may include the baseband modem further configured to reduce the calculated duration by a factor of at least 2.

In Example 67, the subject matter of Examples 62-66 may include the baseband modem further configured further comprising calculate the duration of the evaluation timer based on a discontinuous reception (DRX) cycle length.

In Example 68, the subject matter of Example 67 may include wherein the duration of the evaluation timer is at least two times the DRX cycle length.

In Example 69, the subject matter of Examples 62-66 may include the baseband modem further configured to wait for a measurement indication for each frequency.

In Example 70, the subject matter of Example 69 may include wherein the measurement indication for each frequency is an inter-frequency indication as determined by the device.

In Example 71, the subject matter of Examples 62-70 may include the baseband modem further configured to determine the duration of the evaluation timer by waiting for the results from a layer 1 component of the device for all cells detected during the frequency measurement while the evaluation timer is running.

In Example 72, the subject matter of Examples 62-71 may include the baseband modem further configured to measure each frequency at least two times throughout the duration of the evaluation timer.

In Example 73, the subject matter of Examples 62-72 may include wherein the duration of the evaluation timer is at most one-half the length of the second timer.

In Example 74, the subject matter of Examples 62-73 may include the baseband modem further configured to perform a redistribution algorithm in order to select the target frequency.

In Example 75, the subject matter of Examples 62-74 may include wherein the second timer is a T360 timer.

In Example 76, the subject matter of Example 62-75 may include wherein the frequencies in the first set of frequencies comprise frequencies which are assigned a redistributionInterFreqInfo from the network.

In Example 77, a computer readable medium with instructions which when executed cause a processor of a device to select a target frequency from a network in response to a redistribution information, comprising: starting an evaluation timer; performing measurements on a first set of frequencies throughout a duration of the evaluation timer; selecting the target frequency based on the measurements of the first set of frequencies; and starting a second timer, which is distinct from the evaluation timer, during which time the device performs measurements on a second set of frequencies comprising the target frequency.

In Example 78, the subject matter of Example 77 may include the redistribution information comprising a redistributionInterFreqInfo.

In Example 79, the subject matter of Example 78 may include the device receiving the redistributionInterFreqInfo in a system information block (SIB) 5.

In Example 80, the subject matter of Examples 78-79 may include the redistribution information comprising a redistributionServingInfo.

In Example 81, the subject matter of Example 80 may include receiving the redistributionServingInfo in a SIB 3.

In Example 82, the subject matter of Examples 77-81 may include wherein the first set of frequencies comprises inter-frequencies with the redistribution information provided to the device from the network.

In Example 83, the subject matter of Examples 77-82 may include wherein the evaluation timer is a Radio Resource Control (RRC) timer.

In Example 84, the subject matter of Examples 77-83 may include calculating the duration of the evaluation timer based on a number of inter-frequency carriers.

In Example 85, the subject matter of Example 84 may include calculating the duration of the evaluation timer based on a time needed to detect new cells.

In Example 86, the subject matter of Example 85 may include further comprising calculating the duration of the evaluation timer by multiplying the number of inter-frequency carriers by the time needed to detect new cells.

In Example 87, the subject matter of Example 86 may include reducing the calculated duration by a factor of at least 2.

In Example 88, the subject matter of Examples 77-83 may include calculating the duration of the evaluation timer based on a discontinuous reception (DRX) cycle length.

In Example 89, the subject matter of Example 88 may include wherein the duration of the evaluation timer is at least two times the DRX cycle length.

In Example 90, the subject matter of Examples 77-83 may include waiting for a measurement indication for each frequency.

In Example 91, the subject matter of Example 90 may include wherein the measurement indication for each frequency is an inter-frequency indication as determined by the device.

In Example 92, the subject matter of Examples 77-83 may include determining the duration of the evaluation timer by waiting for the results from a layer 1 component of the device for all cells detected during the frequency measurement while the evaluation timer is running.

In Example 93, the subject matter of Examples 77-92 may include measuring each frequency at least two times throughout the duration of the evaluation timer.

In Example 94, the subject matter of Examples 77-93 may include wherein the duration of the evaluation timer is at most one-half the length of the second timer.

In Example 95, the subject matter of Examples 77-94 may include performing a redistribution algorithm in order to select the target frequency.

In Example 96, the subject matter of Examples 77-95 may include wherein the second timer is a T360 timer.

In Example 97, the subject matter of Examples 77-96 may include wherein the set of high priority frequencies is indicated by information broadcast by the network.

In Example 98, the subject matter of Examples 77-97 may include disregarding to measure one or more frequencies indicated in a redistribution information from the network if they are not high priority frequencies.

In Example 99, the subject matter of Examples 77-98 may include wherein the second set of frequencies comprises fewer frequencies than the first set of frequencies.

In Example 100, a computer readable medium with instructions which when executed cause a processor of a device to select a target frequency from a network in response to a redistribution reselection including a redistributionInterFreqInfo of a frequency with a low priority, comprising: starting an evaluation timer; performing measurements on a first set of frequencies throughout a duration of the evaluation timer; selecting the target frequency based on the measurements of the first set of frequencies; and starting a second timer, which is distinct from the evaluation timer, during which time the device performs measurements on a second set of frequencies comprising the target frequency.

In Example 101, the subject matter of Example 100 may include calculating the duration of the evaluation timer based on a number of inter-frequency carriers.

In Example 102, the subject matter of Examples 100-101 may include calculating the duration of the evaluation timer based on a time needed to detect new cells.

In Example 103, the subject matter of Example 102 may include calculating the duration of the evaluation timer by multiplying the number of inter-frequency carriers by the time needed to detect new cells.

In Example 104, the subject matter of Example 103 may include reducing the calculated duration by a factor of at least 2.

In Example 105, the subject matter of Examples 100-104 may include calculating the duration of the evaluation timer based on a discontinuous reception (DRX) cycle length.

In Example 106, the subject matter of Example 105 may include wherein the duration of the evaluation timer is at least two times the DRX cycle length.

In Example 107, the subject matter of Examples 100-104 may include waiting for a measurement indication for each frequency.

In Example 108, the subject matter of Example 107 may include wherein the measurement indication for each frequency is an inter-frequency indication as determined by the device.

In Example 109, the subject matter of Examples 100-104 may include determining the duration of the evaluation timer by waiting for the results from a layer 1 component of the device for all cells detected during the frequency measurement while the evaluation timer is running.

In Example 110, the subject matter of Examples 100-109 may include measuring each frequency at least two times throughout the duration of the evaluation timer.

In Example 111, the subject matter of Examples 100-110 may include wherein the duration of the evaluation timer is at most one-half the length of the second timer.

In Example 112, the subject matter of Examples 100-111 may include performing a redistribution algorithm in order to select the target frequency.

In Example 113, the subject matter of Examples 100-112 may include wherein the second timer is a T360 timer.

In Example 114, the subject matter of Examples 100-113 may include wherein the frequencies in the first set of frequencies comprise frequencies which are assigned a redistributionInterFreqInfo from the network.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A communication device configured to select a target frequency from a network in response to a redistribution information, comprising:
    a radio frequency transceiver configured to receive a redistribution information from the network;
    a baseband modem configured to:
        trigger an evaluation timer;
        perform measurements on a first set of frequencies throughout a duration of the evaluation timer;
        select the target frequency based on the measurements of the first set of frequencies; and
        trigger a second timer, which is distinct from the evaluation timer, during which the communication device performs measurements on a second set of frequencies comprising the target frequency.

2. The communication device of claim 1, wherein the first set of frequencies comprises inter-frequencies with the redistribution information provided to the communication device from the network.

3. The communication device of claim 1, wherein the evaluation timer is a Radio Resource Control (RRC) timer.

4. The communication device of claim 1, the baseband modem further configured to calculate the duration of the evaluation timer based on a number of inter-frequency carriers.

5. The communication device of claim 1, the baseband modem further configured to calculate the duration of the evaluation timer based on a time needed to detect new cells.

6. The communication device of claim 5,
    the baseband modem further configured to calculate the duration of the evaluation timer by multiplying a number of inter-frequency carriers by the time needed to detect new cells.

7. The communication device of claim 1, the baseband modem further configured to calculate the duration of the evaluation timer based on a discontinuous reception (DRX) cycle length.

8. The communication device of claim 7, wherein the duration of the evaluation timer is at least two times the DRX cycle length.

9. The communication device of claim 1, the baseband modem further configured to measure each frequency at least two times throughout the duration of the evaluation timer.

10. The communication device of claim 1,
wherein the duration of the evaluation timer is at most about one-half a length of the second timer.

11. The communication device of claim 1, the baseband modem further configured to perform a redistribution algorithm in order to select the target frequency.

12. The communication device of claim 1, wherein the second timer is a T360 timer.

13. The communication device of claim 1, the baseband modem further configured to disregard measuring one or more frequencies indicated in a redistribution information from the network during the second timer if the one or more frequencies are not high priority frequencies.

14. The communication device of claim 1, wherein the second set of frequencies comprises fewer frequencies than the first set of frequencies.

15. A method for a mobile device in idle mode to select a target frequency from a network in response to a redistribution information, comprising:
   starting an evaluation timer;
   performing measurements on a first set of frequencies throughout a duration of the evaluation timer;
   selecting the target frequency based on the measurements of the first set of frequencies; and
   starting a second timer, which is distinct from the evaluation timer, during which the mobile device performs measurements on a second set of frequencies comprising the target frequency.

16. The method of claim 15,
wherein the first set of frequencies comprises inter-frequencies with the redistribution information provided to the mobile device from the network.

17. The method of claim 15, further comprising calculating the duration of the evaluation timer based on a number of inter-frequency carriers.

18. The method of claim 15, further comprising calculating the duration of the evaluation timer based on a time needed to detect new cells.

19. The method of claim 15, further comprising calculating the duration of the evaluation timer based on a discontinuous reception (DRX) cycle length.

20. The method of claim 15,
further comprising determining the duration of the evaluation timer by waiting for results from a layer 1 component of the mobile device for all cells detected during the measurements on the first set of frequencies while the evaluation timer is running.

21. The method of claim 15,
wherein the duration of the evaluation timer is at most one-half a length of the second timer.

22. The method of claim 15, further comprising measuring each frequency at least two times throughout the duration of the evaluation timer.

23. A non-transitory computer readable medium storing instructions thereon that, when executed, cause a processor of a device to perform a selection of a target frequency from a network in response to a redistribution information comprising:
   starting an evaluation timer;
   performing measurements on a first set of frequencies throughout a duration of the evaluation timer;
   selecting the target frequency based on the measurements of the first set of frequencies; and
   starting a second timer, which is distinct from the evaluation timer, during which the device performs measurements on a second set of frequencies comprising the target frequency.

24. The non-transitory computer readable medium of claim 23, further comprising measuring each frequency at least two times throughout the duration of the evaluation timer.

25. The non-transitory computer readable medium of claim 23,
wherein the duration of the evaluation timer is at most one-half a length of the second timer.

* * * * *